United States Patent
Hall et al.

(10) Patent No.: US 10,241,806 B2
(45) Date of Patent: *Mar. 26, 2019

(54) ADJUSTING USER INTERFACES BASED ON ENTITY LOCATION

(71) Applicant: MICROSOFT TECHNOLOGY LICENSING, LLC, Redmond, WA (US)

(72) Inventors: Michael Hall, Snohomish, WA (US); Alexander T. Bussmann, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

This patent is subject to a terminal disclaimer.

(21) Appl. No.: 15/065,687

(22) Filed: Mar. 9, 2016

(65) Prior Publication Data

US 2016/0266911 A1   Sep. 15, 2016

Related U.S. Application Data

(63) Continuation of application No. 13/237,416, filed on Sep. 20, 2011, now Pat. No. 9,293,107.

(51) Int. Cl.
*G06F 9/44*   (2018.01)
*G09G 5/00*   (2006.01)
(Continued)

(52) U.S. Cl.
CPC .......... *G06F 9/4443* (2013.01); *G06F 3/0484* (2013.01); *G06F 9/451* (2018.02);
(Continued)

(58) Field of Classification Search
CPC .............. A63F 13/06; A63F 13/2145; A63B 2220/803; G06F 3/0346; G06F 1/1694;
(Continued)

(56) References Cited

U.S. PATENT DOCUMENTS

| 6,069,619 A | 5/2000 | Kim |
| 2005/0229200 A1 | 10/2005 | Kirkland et al. |

(Continued)

FOREIGN PATENT DOCUMENTS

| CN | 101506789 A | 8/2009 |
| CN | 101782890 A | 7/2010 |

(Continued)

OTHER PUBLICATIONS

"Non-Final Office Action Issued in U.S. Appl. No. 13/237,416", dated Jun. 19, 2014, 18 Pages.
"Final Office Action Issued in U.S. Appl. No. 13/237,416", dated Feb. 10, 2015, 26 Pages.
"Non-Final Office Action Issued in U.S. Appl. No. 13/237,416", dated Aug. 4, 2015, 14 Pages.

(Continued)

*Primary Examiner* — Haixia Du
(74) *Attorney, Agent, or Firm* — Workman Nydegger (57) ABSTRACT

The present invention extends to methods, systems, and computer program products for adjusting user interfaces based on entity location. Embodiments of the invention provide applications (or an operating system) with entity distance/proximity data. Applications can then scale content appropriately based on the proximity data. An operating system contains a distance/proximity driver framework for distance/proximity aware hardware sensors (IR, Radar, capacitive, camera, other). The proximity framework performs distance/proximity/number of viewers calculations from sensor data to formulate proximity data. From the proximity data, an application can determine how to scale user interface data.

17 Claims, 5 Drawing Sheets

(51) Int. Cl.

| | | |
|---|---|---|
| *G09G 5/32* | (2006.01) | |
| *G09G 5/373* | (2006.01) | |
| *G09G 5/377* | (2006.01) | |
| *G09F 19/14* | (2006.01) | |
| *G06Q 30/02* | (2012.01) | |
| *G06F 3/0484* | (2013.01) | |
| *G06F 9/451* | (2018.01) | |
| *G09F 27/00* | (2006.01) | |

(52) U.S. Cl.
CPC ..... *G06Q 30/0261* (2013.01); *G06Q 30/0266* (2013.01); *G06Q 30/0272* (2013.01); *G09F 19/14* (2013.01); *G09G 5/00* (2013.01); *G09G 5/32* (2013.01); *G09G 5/373* (2013.01); *G09G 5/377* (2013.01); *G09F 2027/001* (2013.01); *G09G 2340/0407* (2013.01); *G09G 2340/0464* (2013.01); *G09G 2340/14* (2013.01); *G09G 2354/00* (2013.01)

(58) Field of Classification Search
CPC .......... G06F 2200/1637; G01C 21/165; G06K 9/22; H04M 2250/12; H04N 1/00307
See application file for complete search history.

(56) References Cited

U.S. PATENT DOCUMENTS

| | | |
|---|---|---|
| 2006/0202952 A1 | 9/2006 | Sato et al. |
| 2006/0229939 A1 | 10/2006 | Bhakta et al. |
| 2007/0205963 A1 | 9/2007 | Piccionelli et al. |
| 2008/0030360 A1* | 2/2008 | Griffin .................. G06F 1/1626 340/689 |
| 2009/0164896 A1 | 6/2009 | Thorn |
| 2009/0284594 A1 | 11/2009 | Mitsuhashi |
| 2009/0315869 A1 | 12/2009 | Sugihara et al. |
| 2010/0026723 A1 | 2/2010 | Nishihara et al. |
| 2010/0039402 A1* | 2/2010 | Okazaki ............... G06F 1/3231 345/173 |
| 2010/0169766 A1 | 7/2010 | Duarte et al. |
| 2010/0223112 A1 | 9/2010 | Griffin et al. |
| 2010/0328351 A1 | 12/2010 | Tan |
| 2011/0141068 A1 | 6/2011 | Dai |
| 2013/0047100 A1 | 2/2013 | Kroeger et al. |

FOREIGN PATENT DOCUMENTS

| | | |
|---|---|---|
| CN | 101894511 A | 11/2010 |
| GB | 2387504 A | 10/2003 |
| JP | 2001319217 A | 11/2001 |
| JP | 2003271283 A | 9/2003 |
| JP | 2005207783 A | 8/2005 |
| JP | 2006285157 A | 10/2006 |
| JP | 2007272369 | 10/2007 |
| JP | 2010004118 A | 1/2010 |
| RU | 2408923 C2 | 1/2011 |
| WO | 3088013 A2 | 10/2003 |

OTHER PUBLICATIONS

"Notice of Allowance Issued in U.S. Appl. No. 13/237,416", dated Nov. 13, 2015, 5 Pages.
"Notice of Allowance Issued in Chinese Patent Application No. 201210352255.5", dated May 26, 2016, 4 Pages.
"Office Action Issued in Japanese Patent Application No. 2014-531860", dated Jun. 28, 2016, 7 Pages.
"Notice of Allowance Issued in Russian Patent Application No. 2014110505", dated Mar. 29, 2017, 22 Pages.
"Office Action Issued in Australian Patent Application No. 2012312850", dated Sep. 15, 2016, 3 Pages.
"Office Action Issued in Russian Patent Application No. 2014110505", dated Sep. 8, 2016, 5 Pages.
"Supplementary Search Report Issued in European Patent Application No. 12833833.2", dated Apr. 23, 2015, 11 Pages.
"Office Action Issued in European Patent Application No. 12833833.2", dated Feb. 10, 2016, 11 Pages.
"Office Action Issued in European Patent Application No. 12833833.2", dated Oct. 22, 2015, 5 Pages.
"Partial Search Report issued in European Patent Application No. 12833833.2", dated Jan. 16, 2015, 6 Pages.
"International Search Report & Written Opinion Issued in PCT Application No. PCT/US2012/054700", dated Jan. 2, 2013, 9 Pages.
"First Office Action and Search Report Issued in Chinese Patent Application No. 201210352255.5", dated Sep. 2, 2014, 14 Pages.
"Second Office Action Issued in Chinese Patent Application No. 201210352255.5", dated May 11, 2015, 7 Pages.
"Third Office Action Issued in Chinese Patent Application No. 201210352255.5", dated Nov. 16, 2015, 7 Pages.
"Optical Sensors in Smart Mobile Devices", in TND415/D, Rev: 0, Semiconductor Components Industries LLC, Nov. 2010, 13 Pages.
Ball, et al., "Move to Improve: Promoting Physical Navigation to Increase User Performance with Large Displays, In Proceedings of the SIGCHI Conference on Human Factors in Computing Systems", Apr. 28, 2007, 10 Pages.
Harrision, et al., "Lean and Zoom: Proximity-Aware User Interface and Content Magnification", In Proceedings of the SIGCHI Conference on Human Factors in Computing Systems, Apr. 5, 2008, 4 Pages.
Iwabuchi, et al., "Smart Makeup Mirror: Computer-Augmented Mirror to Aid Makeup Application", In Proceedings of Human-Computer Interaction, Part IV, Interacting in Various Application Domains, Lecture Notes in Computer Science, vol. 5613, Jul. 24, 2006, 9 Pages.
Lu, et al. "Gesture Avatar: A Technique for Operating Mobile User Interfaces Using Gestures", In Proceedings of the SIGCHI Conference on Human Factors in Computing Systems, May 7, 2011, 10 Pages.
"Office Action and Search Report Issued in Canadian Patent Application No. 2,849,089", dated Jul. 11, 2018, 8 Pages.
"Office Action Issued in Mexican Patent Application No. MX/a/2014/003428", dated May 30, 2016, 7 Pages.

* cited by examiner

ADJUSTING USER INTERFACES BASED ON ENTITY LOCATION

CROSS-REFERENCE TO RELATED APPLICATIONS

This application is a continuation of U.S. patent application Ser. No. 13/237,416 filed on Sep. 20, 2011, entitled "ADJUSTING USER INTERFACES BASED ON ENTITY LOCATION," which issued as U.S. Pat. No. 9,293,107 on Mar. 22, 2016, and which application is expressly incorporated herein by reference in its entirety.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Most applications present some type of user-interface at a display device that permits a user to interact with the application. An application's user interface typically tends to be optimized for a specific user distance. That is, user interfaces are developed with a specific user experience and user distance in mind (e.g., television 10 feet, eBook 2 feet, digital signage 30 feet, etc.).

For some applications, distance and/or proximity can be used to enable/disable user-interface elements in a fixed size configuration, such as, a rear-view camera on a vehicle or a user-interface surface on a smart phone. For example, on a smart phone a touch surface can be disabled when a user is close to a proximity sensor. This can be used to disable the touch surface when a user moves the phone close to their face for voice communication.

BRIEF SUMMARY

The present invention extends to methods, systems, and computer program products for adjusting user interfaces based on entity location. User interface data is provided to a display device for presentation at a viewing surface. The user interface data represents a user interface for the application. Proximity data is accessed. The proximity data indicates that one or more entities changed position subsequent to presentation of the user interface data. The changes in position of the one or more entities place each of the one or more entities in a new location relative to the display device.

Adjusted user interface data is formulated for the user interface based on the proximity data. The adjusted user interface data is determined to be appropriate for presentation at the viewing surface based on the new locations of the one or more entities relative to the display device. The adjusted user interface data is provided to the display device to adjust presentation of the user interface at the viewing surface in response to the changes in position of the one or more entities.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for adjusting user-interface presentation based on entity location. User interface data is provided to a display device for presentation at a viewing surface. The user interface data represents a user interface for the application. Proximity data is accessed. The proximity data indicates that one or more entities changed position subsequent to presentation of the user interface data. The changes in position of the one or more entities place each of the one or more entities in a new location relative to the display device.

Adjusted user interface data is formulated for the user interface based on the proximity data. The adjusted user interface data is determined to be appropriate for presentation at the viewing surface based on the new locations of the one or more entities relative to the display device. The adjusted user interface data is provided to the display device to adjust presentation of the user interface at the viewing surface in response to the changes in position of the one or more entities.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, digital signs, video game consoles, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention provide applications (or an operating system) with entity distance/proximity data. Applications can then scale content appropriately based on the proximity data. An operating system contains a distance/proximity driver framework for distance/proximity aware hardware sensors (IR, Radar, capacitive, camera, other). Devices can ship with one or more sensors, which feed into the proximity framework. Some sensors may be more appropriate for a fixed location (e.g., digital signage). Other sensors may be more appropriate for a mobile location (robotics/mobile devices). The proximity framework performs distance/proximity/number of viewers calculations from sensor data.

Thus, an operating system proximity framework can provide proximity data to running applications. Proximity data can be exposed as a message, event or through other mechanisms. Scaling data can be provided with the message/event exposing the proximity data. Alternately, an application can determine scaling data based on the proximity data. Scaling data can be provided/determines as pure distance (inches/feet/meters), or as a relative distance from the device and/or as an array of sensor information based on whether the sensors can provide input on a single point of distance (one user) or multiple users (Camera, Radar). Scaling UI elements within an application can be based on the application type/content. For example, some applications may choose not to scale the user experience, others may implement this functionality as a core element of the application UI (e.g., digital signage).

Figure 1:
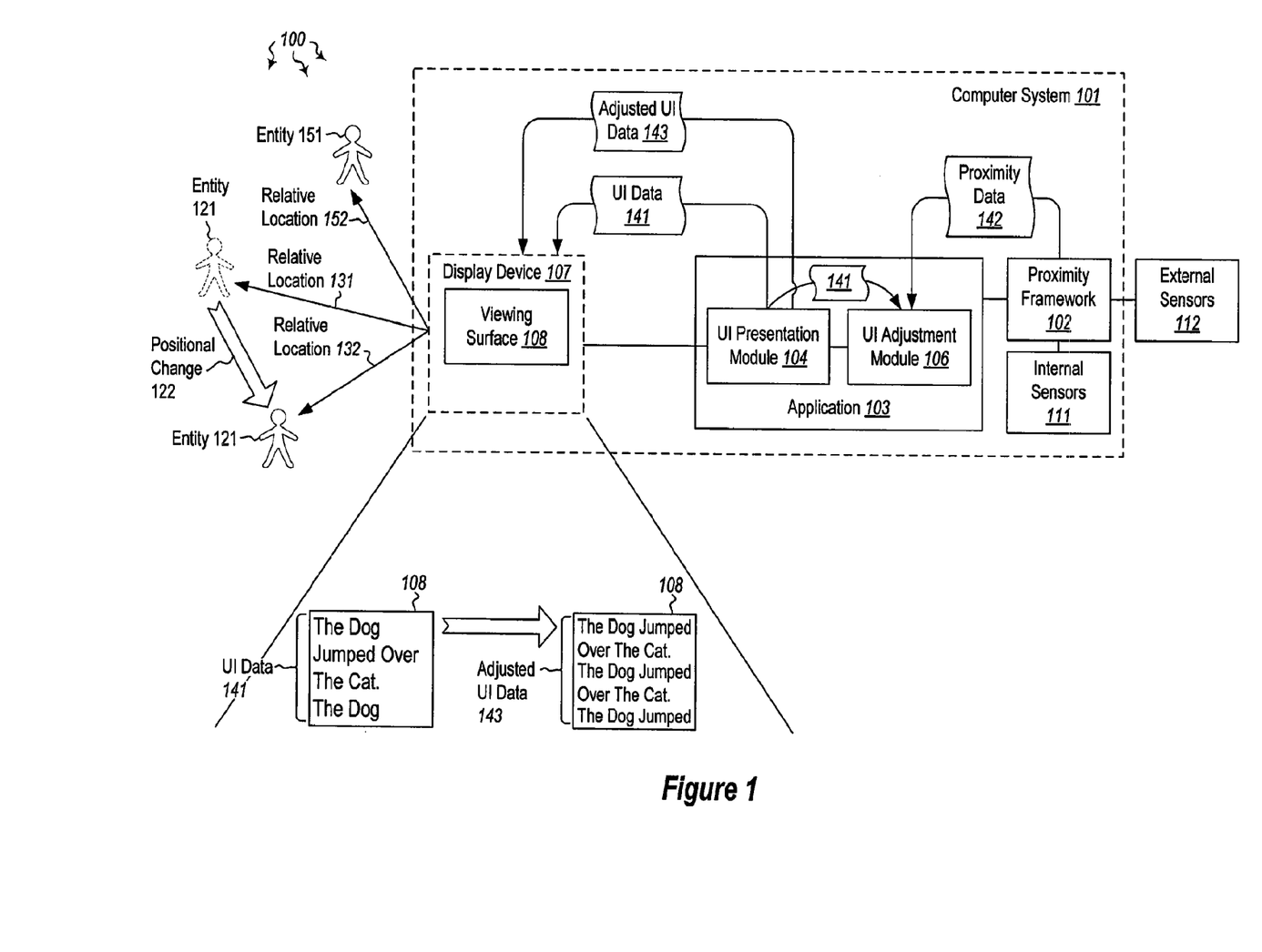
FIG. 1 illustrates an example computer architecture that facilitates adjusting a user interface based on entity location.

FIG. 1 illustrates an example computer architecture 100 that facilitates adjusting a user interface based on entity location. Referring to FIG. 1, computer architecture 100 includes computer system 101 and external sensors 112. Each of the computer system 101 and external sensors 112 are connected to one another over (or is part of) a network, such as, for example, a Local Area Network ("LAN"), a Wide Area Network ("WAN"), and even the Internet. Accordingly, computer system 101 and external sensors 112 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, computer system 101 includes proximity framework 102, application 103, display device 107, and internal sensors 111. Proximity framework 102 is configured to receive sensor output (e.g., from one or more sensors in internal sensors 111 and/or external sensors 112). From sensor output, proximity framework 102 can formulate proximity data for one or more entities (e.g., one or more persons, one or more vehicles, one or more other objects, etc., or combinations thereof). Proximity data can indicate the angle and/or position of the one or more entities relative to display device 107. Proximity framework 102 can expose the proximity data available to applications (e.g., application 103). Proximity data can be exposed in a message, event, or through other mechanisms.

Internal sensors 111 and external sensors 112 can include any number of different types of sensors, including but not limited to: Infrared ("IR") sensors, Radar, capacitive sensors, cameras, Global Positioning System ("GPS") sensors, Ultrasonic sensors, laser sensors, and Light Detection and Ranging ("LIDAR") sensors. Internal sensors 111 can be physically located at or even within computer system 101. For example, computer system 101 can have a camera pointing in the direction of a viewing proximity for viewing surface 108. External sensors 112 can be physically located some distance away from computer system 101. For example, GPS sensors can be located within a vehicle that is passing viewing surface 108.

As depicted, application 103 includes UI presentation module 104 and UI adjustment module 106. In general, UI presentation module 104 is configured to send user interface data to display device 107 for display on viewing surface 108. UI adjustment module 106 can access current user interface data as well as access proximity data from proximity framework 102. From current user interface data and proximity data, UI adjustment module 106 can determine how to appropriately adjust subsequent user interface data for presentation at viewing surface 108. For example, UI adjustment module 106 can adjust one or more of: the scale, the substance, and the timing of user interface data presented at viewing surface 108 based on accessed proximity data.

Display device 107 can be a general or special purpose display device, such as, a computer monitor, television, or digital sign. Display device 107 can be physically integrated into computer system 101 or can be connected to computer system 101 through external connections (e.g., a video cable). User interface data is presented at viewing surface 108, such as, for example, at a computer monitor screen, at a television screen, at a digital sign screen. Viewing surface 108 can be oriented in a specified direction relative to other components of display device 107 and/or of computer system 101.

In some embodiments, viewing surface 108 can also have a specified viewing area. The specified viewing area can indicate a distance range and/or angle range from viewing surface 108 where presented UI data is humanly perceptible. Within the specified viewing area, proximity data can be used to adjust presented UI data as entities change position. When no entities are within the specified viewing area of viewing surface 108, a UI adjustment can be used to stop presenting UI data at viewing surface 108.

Figure 2:
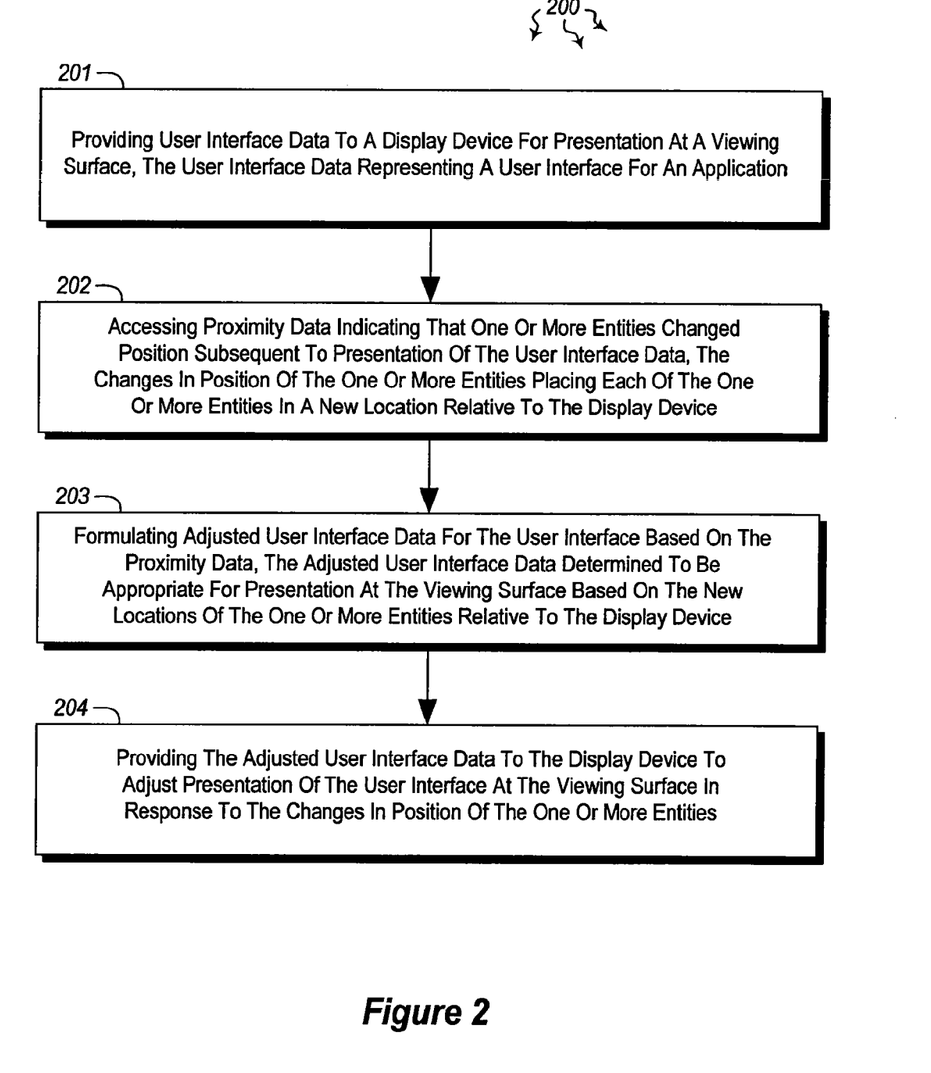
FIG. 2 illustrates a flow chart of an example method for adjusting a user interface based on entity location.

FIG. 2 illustrates a flow chart of an example method 200 for adjusting a user interface based on entity location. Method 200 will be described with respect to the components and data of computer architecture 100.

Method 200 includes an act of presenting user interface data at a viewing surface, the user interface data representing a user interface for an application (act 201). Entity 121 (e.g., a person or vehicle) can be at relative location 131 with respect to display device 107. When entity 121 is a relative location 131, UI presentation module 104 can send UI data 141 to display device 107. Display device 107 can display UI data 141 (a user interface for application 103) at viewing surface 108.

UI presentation module 104 can also send UI data 141 to UI adjustment module 106.

After presentation of UI data 141, entity 121 can undergo positional change 122 (e.g., due to pedestrian or vehicular movement). Positional change 122 causes entity 121 to be at relative location 132 with respect to display device 107. Positional change 122 can be a change in distance and/or angle from relative location 131. One or more sensors in internal sensors 111 and/or external sensors 112 can detect positional change 122 and/or that entity 121 is at relative location 132. The one or more sensors can provide sensor output to proximity framework 102. From the sensor output, proximity framework 102 can formulate proximity data 142.

Method 200 includes an act of accessing proximity data indicating that one or more entities changed position subsequent to presentation of the user interface data, the changes in position of the one or more entities placing each of the one or more entities in a new location relative to the display device (act 202). For example, UI adjustment module 106 can access proximity data 142. Proximity data 142 indicates to UI adjustment module 106 that entity 121 moved from relative location 131 to relative location 132 subsequent to presentation of UI data 141.

Method 200 includes an act of formulating a user interface data update for the application based on the proximity data, the user interface data update appropriate for presentation at the viewing surface based on the new locations of the one or more entities relative to the display device (act 203). For example, UI adjustment module 106 can indicate how to UI presentation module 104 how to adjust (e.g., scale, add content to, remove content from, pause, etc.) UI data 141. From the indication of how to adjust UI data 141, UI presentation module 104 can formulate adjusted UI data 143. Adjusted UI data 143 can be appropriate for presentation at viewing surface 108 based on entity 121 being at relative location 132.

As depicted, entity 121 is somewhat closer to display device 107 after positional change 122. As such, an appropriate adjustment to UI data 141 can be to scale down the size of UI data 141. That is, since entity 121 is now closer to display device 107, entity 121 can perceive UI data presented at a smaller scale. A side effect of presenting UI data at a smaller scale is that more UI data can be presented. That is, presenting UI data at a smaller scale frees up space on viewing surface 108. Thus, adjusted UI data 143 can be configured to present UI data 141 at a smaller scale.

The freed up space can be used to present more of what was already presented at viewing surface 108. For example, if UI data 141 is a part of a paragraph of text, more and possible all of the paragraph can be presented. Thus, adjusted UI data 143 can also be configured to present more of UI data 141 at a smaller scale. Alternately, the freed up space can be used to present different and/or additional content at viewing surface 108. For example, a graphic can be included within previously presented text. Thus, adjusted UI data 143 can also be configured to present other UI data elements to supplement UI data 141.

Alternately, if entity 121 were to move further from display device 107, an appropriate adjustment to UI data 141 can be to scale up the size of UI data 141. That is, since entity 121 is now further from display device 107, entity 121 can no longer perceive UI data presented at previously utilized scale. A side effect of presenting UI data at a larger scale is that less UI data can be presented. That is, when presenting UI data at a larger scale each presented element consumes more space on viewing surface 108. Thus, adjusted UI data 143 can be configured to present parts of UI data 141 at a larger scale. Alternately or in combination, adjusted UI data 143 can be configured to remove other previously UI data elements (e.g., graphics).

UI presentation module 104 can send adjusted UI data 143 to display device 107.

Method 200 includes an act of presenting the user interface data update at the viewing surface to update the user interface in response to the changes in position of the one or more entities (act 204). For example, display device 107 can present adjusted UI data 143 at viewing surface 108 to update the user interface for application 103 in response to positional change 122. As depicted, more text is displayed for adjusted UI data 143 that for UI data 141. Since entity 121 is somewhat closer to display device 107 after positional change 122, entity 121 is more likely to be able to perceive UI data at a smaller scale.

When multiple entities are within a viewing area for a viewing surface, the distance of the furthest entity can be used, the distance of the closest entity can be used, or averaging (e.g., an averaging model) can be used to scale UI data. Using averaging, UI data may not be optimally scaled for any one entity but can be sufficiently scaled for a plurality of entities. For example, entity 151 (e.g., a person, vehicle, or other object) can be at relative location 152 with respect to display device 107. In addition to detecting entity 121 at relative position 132, one or more sensors in internal sensors 111 and/or external sensors 112 can also detect that entity 151 is at relative location 152. The one or more sensors can provide sensor output for both entity 121 and entity 151 to proximity framework 102. From the sensor output for both entity 121 and entity 151, proximity framework 102 can formulate proximity data 142.

UI adjustment module 106 can access proximity data 142. Proximity data 142 indicates to UI adjustment module 106 that entity 121 is at relative location 132 and that entity 121 is at relative location 152 subsequent to presentation of UI data 141. UI adjustment module 106 can average the distances represented by relative locations 132 and 152 to determine a distance to use for formulating a UI adjustment. UI adjustment module 106 can indicate to UI presentation module 104 how to adjust (e.g., scale, add content to, remove content from, pause, etc.) UI data 141 based on the averaged distance. From the indication of how to adjust UI data 141, UI presentation module 104 can formulate adjusted UI data 143. Adjusted UI data 143 can be appropriate (although not necessarily optimal for any one entity) for presentation at viewing surface 108 based on entity 121 being at relative location 132 and entity 151 being at location 152.

For example, it may be that entity 121 is 10 feet from display device 108 and entity 151 is 20 feet from display device 108. Thus, UI adjustment module 106 can indicate that UI data is to be scaled for an entity at 15 feet (i.e., (10+20)/2). Although not optimal for either entity 121 or entity 151, scaling for an entity at 15 feet may permit both of entities 121 and 151 to adequately perceive adjusted UI data 143.

Figure 3:
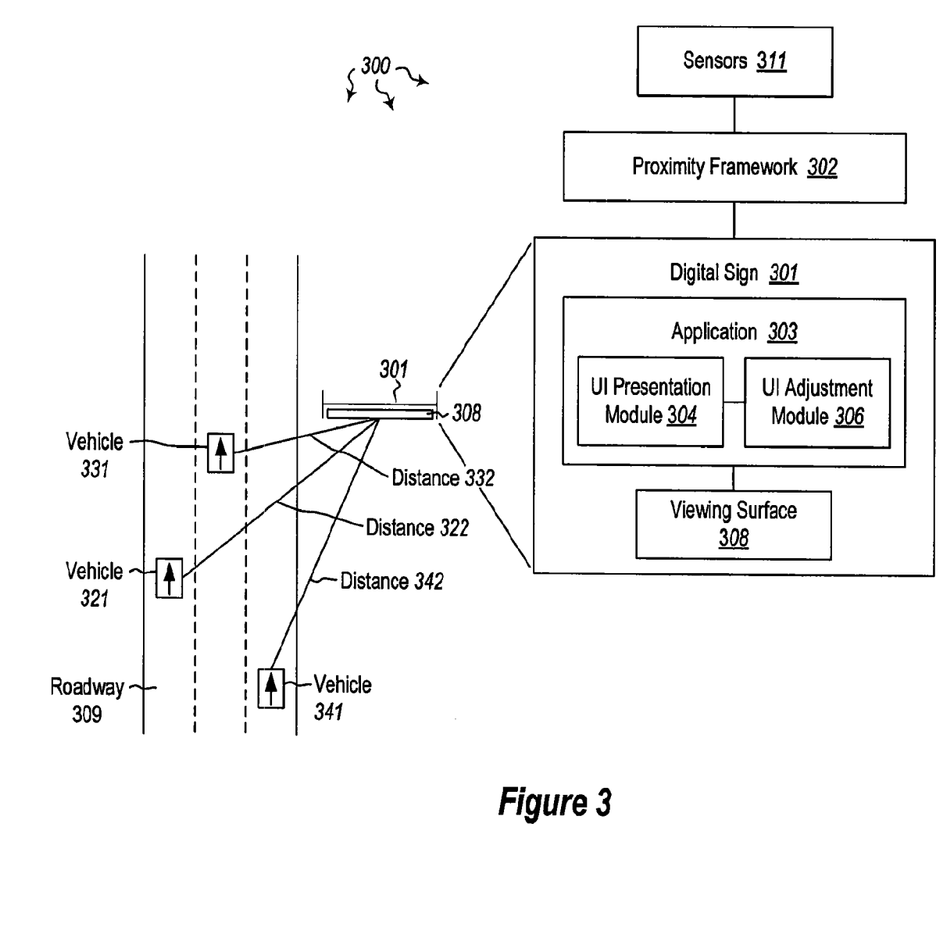
FIG. 3 illustrates an example computer architecture that facilitates adjusting a user interface based on entity location.

FIG. 3 illustrates an example computer architecture 300 that facilitates adjusting a user interface based on entity location. Referring to FIG. 3, computer architecture 300 includes digital sign 301, proximity framework 302, and sensors 311. Each of the digital sign 301, proximity framework 302, and sensors 311 are connected to one another over (or is part of) a network, such as, for example, a Local Area Network ("LAN"), a Wide Area Network ("WAN"), and even the Internet. Accordingly, digital sign 301, proximity framework 302, and sensors 311 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Application 303 can be an advertising application that loops (rotates) through the presentation of a number of advertisements on viewing surface 308 (e.g., a billboard size digital screen) based on a timer interval. The timer interval can be configured such that each of the number of advertisements is presented at viewing surface 308 for a specified period of time.

Vehicles on roadway 309 can approach viewing surface 308. For example, as depicted, vehicles 321, 331, and 341 are approaching viewing surface 308. One or more of sensors 311 can detect the approach of vehicles 321, 331, and 341 and provide sensor output for each of vehicles 321, 331, and 341 to proximity framework 302.

From the sensor output, proximity framework 302 can formulate proximity data for vehicles 321, 331, and 341. From the proximity data, UI adjustment module 306 can determine how to adjust the presentation of advertisements at viewing surface. UI presentation module 104 can then present adjusted UI data.

In some embodiments, based on received proximity data, UI adjustment module 306 determines that one or more of vehicles 321, 331, and 341 have had insufficient time to completely read a currently presented advertisement. In response, UI adjustment module 306 can determine that the loop is to be paused (thus extending the specified period of time) to permit vehicles 321, 331, and 341 additional time to read the currently presented advertisement (even if the timer interval indicates it is for a next advertisement). Alternately or in combination, as vehicles 321, 331, and 341 get closer to viewing surface 308, content presented on viewing surface 308 can be scaled down to provide more context.

In some embodiments, UI adjustment module 306 uses an averaging model to determine how to scale UI data based on distances 322, 332, and 342. In other embodiments, adjustment module 306 can determine how to scale UI data based on distance 322 (the distance of the closest vehicle). In further embodiments, adjustment module 306 can determine how to scale UI data based on distance 342 (the distance of the furthest vehicle). When there are no vehicles on approach to viewing surface 308 within a specified distance, UI adjustment module 306 can determine that viewing surface 308 is to be inactive.

Figure 4A:
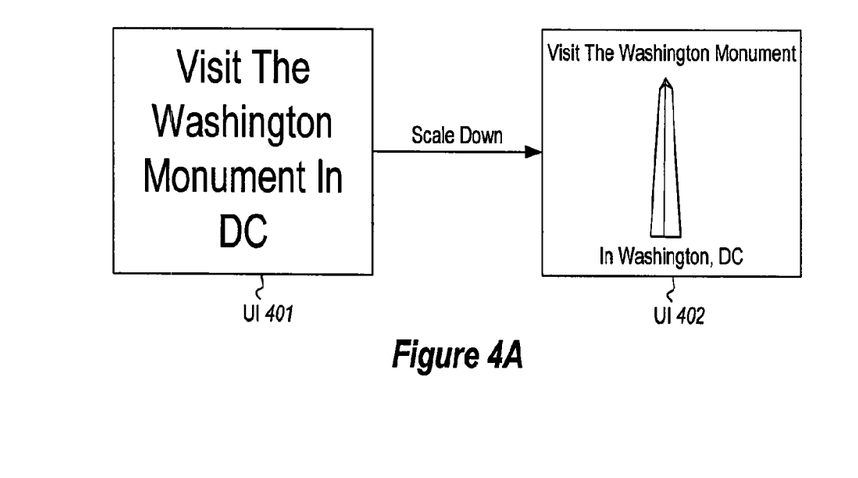
FIG. 4A illustrates an example of scaling down user interface data.
Figure 4B:
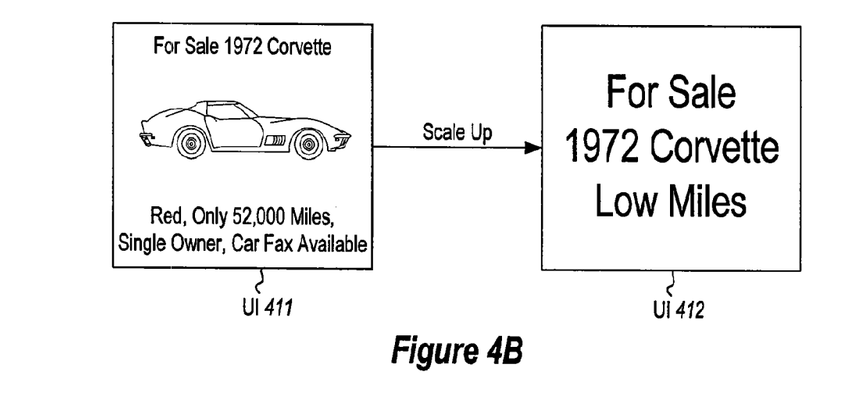
FIG. 4B illustrates an example of scaling up user interface data.

FIG. 4A illustrates an example of scaling down user interface data. As depicted, when scaling down from UI 401 to UI 402 an actual picture of the Washington Monument can included as well as further text added. FIG. 4B illustrates an example of scaling up user interface data. As depicted, when scaling up from UI 411 to UI 412 the picture of the corvette is removed and the text summarized.

Figure 5:
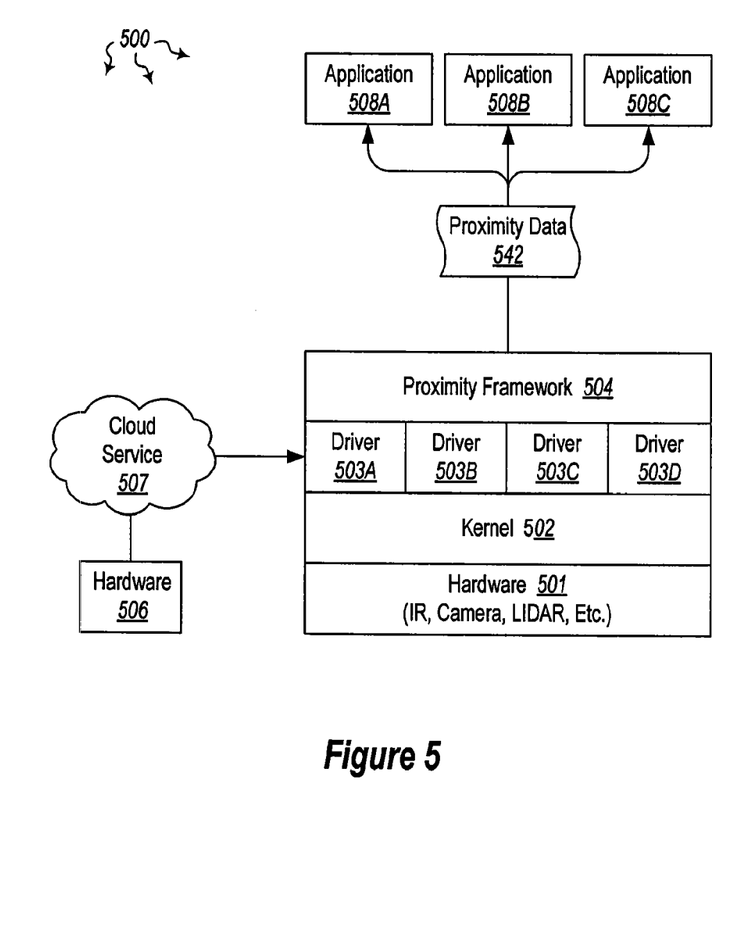
FIG. 5 illustrates an example arrangement of components for providing proximity data to applications.

FIG. 5 illustrates an example arrangement of components 500 for providing proximity data to applications. As depicted, hardware 501 can include one or more sensors including any of ht sensors previously described. The sensors can be connected to kernel 502 (e.g., an operating system kernel) using any of a variety of mechanisms, including USB, Serial, Ethernet, External Bus (e.g., from an automobile network), and I²C. Sensors in hardware 501 can send sensor output to kernel 502.

Drivers 503A, 503B, 503C, and 503D can be vendor specific drivers used to interoperate vendor specific sensors in hardware 501. Driver 503A interacts with cloud service 507 to obtain sensor input from hardware 506. All drivers can feed their output to proximity framework 504. Proximity framework 504 can formulate proximity data 542 from the driver outputs. Proximity data 542 is then available to applications 508A, 508B, and 508C, which can use proximiary data 42 to make adjustments to UI data.

An application can access proximity data in a variety of ways. In some embodiments, an application queries (e.g., using a query API) proximity framework 504 for proximity data. In other embodiments, proximity framework 504 notifies any known applications of proximity data after formulation. In further embodiments, proximity data is provided using a publish/subscribe ("pub/sub") mechanism. Applications register for proximity data of interest. When proximity data of interest changes, proximity framework 504 notifies the registered application of the change.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for adjusting presentation of a user interface at a computer system that includes one or more processors and system memory, the computer system also including a display device and an application, the display device having a viewing surface, the method comprising:
    an act of providing user interface data to the display device for presentation at the viewing surface, the user interface data representing a user interface for the application;
    an act of accessing proximity data indicating a change in relative position of the display device relative to a user;
    an act of formulating adjusted user interface data for the user interface based on the proximity data, the adjusted user interface data determined to be appropriate for presentation at the viewing surface based on the change in position of the display device relative to the user; and
    an act of providing the adjusted user interface data to the display device to adjust presentation of the user interface at the viewing surface in response to the change in position of the display device relative to the user, including replacing previously presented content from the user interface data with summarizing content that summarizes previously presented content based on the formulating adjusted user interface data and by at least replacing and summarizing one or more other terms that were previously presented in the user interface data and that were removed.

2. The method as recited in claim 1, wherein the act of accessing proximity data comprises an act of receiving an indication that the user has undergone a change in position relative to the display device.

3. The method as recited in claim 2, wherein the act of formulating the adjusted user interface data comprises an act of using an averaging model to determine an appropriate scale for presenting the adjusted user interface data update based on the proximity data.

4. The method as recited in claim 2, wherein the act of formulating the adjusted user interface data comprises an act of using an averaging model to identify appropriate content for inclusion in the adjusted user interface data based on the proximity data.

5. The method as recited in claim 1, wherein the act of accessing proximity data comprises an act of receiving an indication that an angle from the viewing surface to the user changed subsequent to presentation of the user interface data.

6. The method as recited in claim 1, wherein the act of formulating adjusted user interface data comprises identifying appropriate content for inclusion in the user interface data.

7. The method as recited in claim 1, wherein the act of formulating adjusted user interface data comprises an act of altering timing for rotating from the user interface data to new user interface data.

8. The method as recited in claim 1, wherein the act of formulating adjusted user interface data comprises an act of altering a scale of the user interface data.

9. The method as recited in claim 8, wherein an act of altering the scale of the user interface data comprises an act of reducing the scale of the user interface data.

10. The method as recited in claim 9, further comprising an act of adding additional content to the user interface data.

11. The method as recited in claim 8, wherein an act of altering the scale of the user interface data comprises an act of increasing the scale of the user interface data.

12. The method as recited in claim 11, further comprising an act of removing previously presented content from the user interface data.

13. The method of claim 1, wherein the method further includes:
    disabling a touch sensitivity of the viewing surface based on the change in position.

14. A computer program product comprising one or more hardware storage devices having stored thereon computer-executable instructions which are executable by one or more processors of a computing system to perform at least the following:
    provide user interface data to a display device of the computing system;
    adjust the user interface data displayed at the display device based at least in part on proximity data obtained from one or more sensors associated with positions of one or more entities;
    provide user interface data to the display device for presentation at the viewing surface, the user interface data representing a user interface for the application;
    access proximity data indicating a change in relative position of the display device relative to the one or more entities;
    formulate adjusted user interface data for the user interface based on the proximity data, the adjusted user interface data determined to be appropriate for presentation at the viewing surface based on the change in position of the display device relative to the one or more entities; and
    provide the adjusted user interface data to the display device to adjust presentation of the user interface at the viewing surface in response to the change in position of the display device relative to the one or more entities, including replacing previously presented content from the user interface data with summarizing content that summarizes previously presented content based on the formulating adjusted user interface data and by at least replacing and summarizing one or more other terms that were previously presented in the user interface data and that were removed.

15. The computer program product of claim 14, wherein the computer-executable instructions are further configured to cause the computing system to:

formulate the adjusted user interface data by adding text to the user interface data based on the change in position.

16. A computing system comprising:

one or more processors;

a display device configured with a viewing surface for displaying user interface data representing a user interface for an application; and one or more hardware storage devices having stored thereon computer-executable instructions which are executable by the one or more processors to perform at least the following:

provide user interface data to the display device;

adjust the user interface data displayed at the display device based at least in part on obtained proximity data associated with positions of one or more entities;

provide user interface data to the display device for presentation at the viewing surface, the user interface data representing a user interface for the application;

access proximity data indicating a change in relative position of the display device relative to the one or more entities;

formulate adjusted user interface data for the user interface based on the proximity data, the adjusted user interface data determined to be appropriate for presentation at the viewing surface based on the change in position of the display device relative to the one or more entities; and provide the adjusted user interface data to the display device to adjust presentation of the user interface at the viewing surface in response to the change in position of the display device relative to the one or more entities, including replacing previously presented content from the user interface data with summarizing content that summarizes previously presented content based on the formulating adjusted user interface data and by at least replacing and summarizing one or more other terms that were previously presented in the user interface data and that were removed.

17. The computing system of claim 16, wherein the computer-executable instructions are further configured to cause the computing system to:

formulate the adjusted user interface data by adding text to the user interface data based on the change in position.

* * * * *